July 17, 1962  H. J. KOEBER  3,044,385
CAMERA
Filed Oct. 5, 1959  3 Sheets-Sheet 1
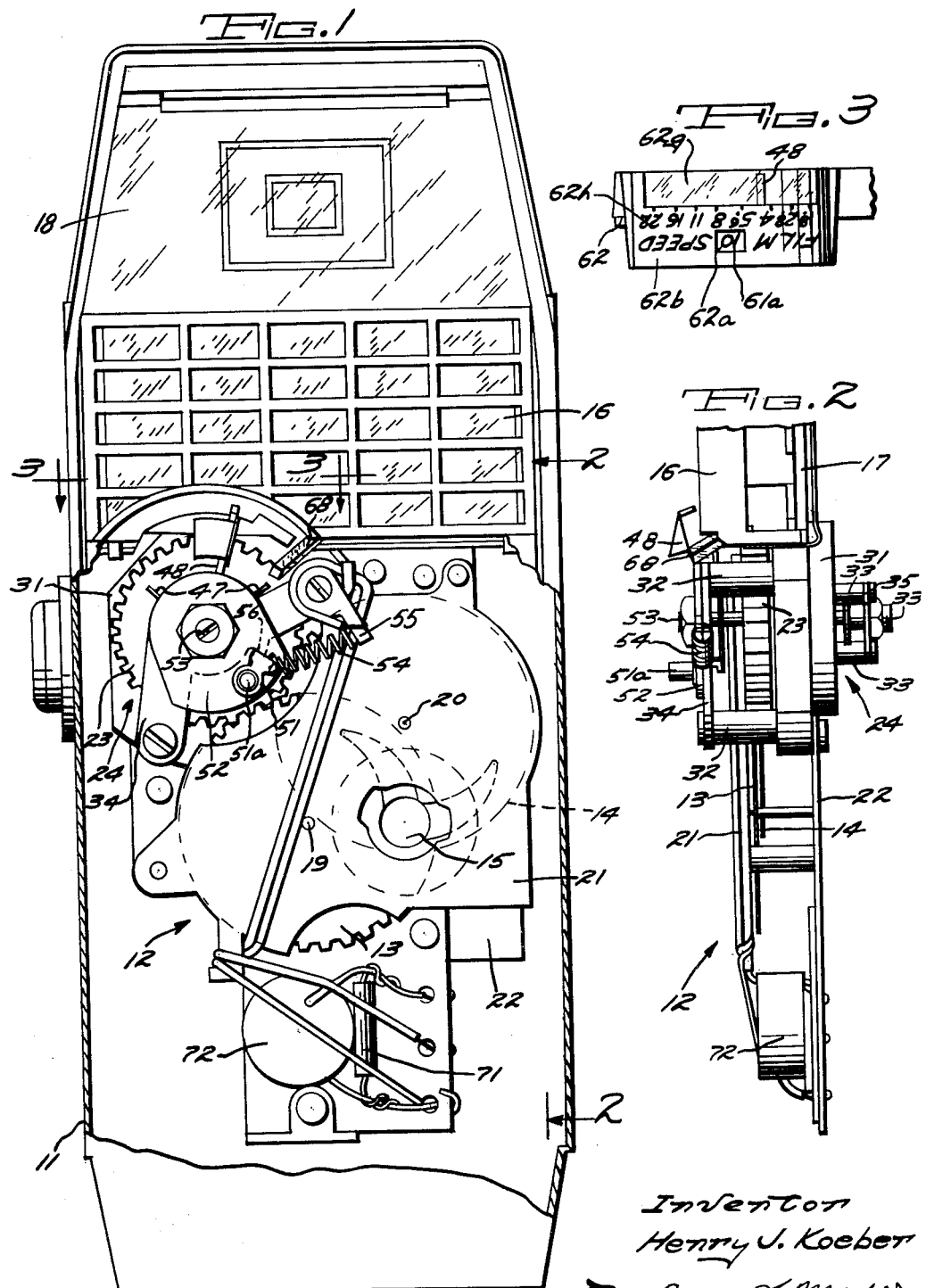
Inventor
Henry J. Koeber
By Robert F. Miehle, Jr.
Atty.

July 17, 1962  H. J. KOEBER  3,044,385
CAMERA
Filed Oct. 5, 1959  3 Sheets-Sheet 2
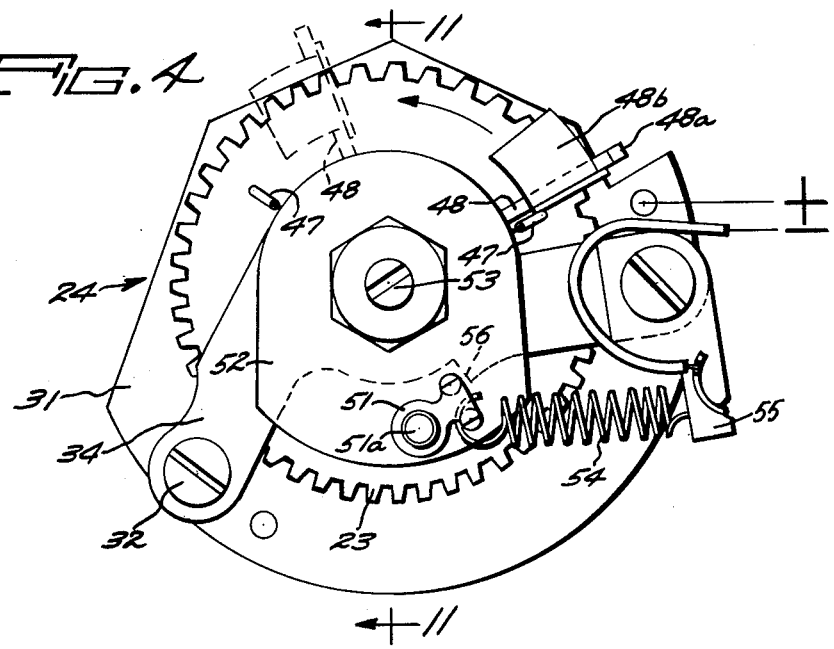
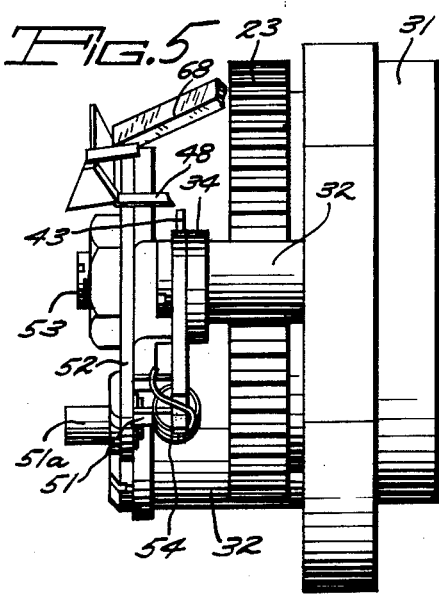
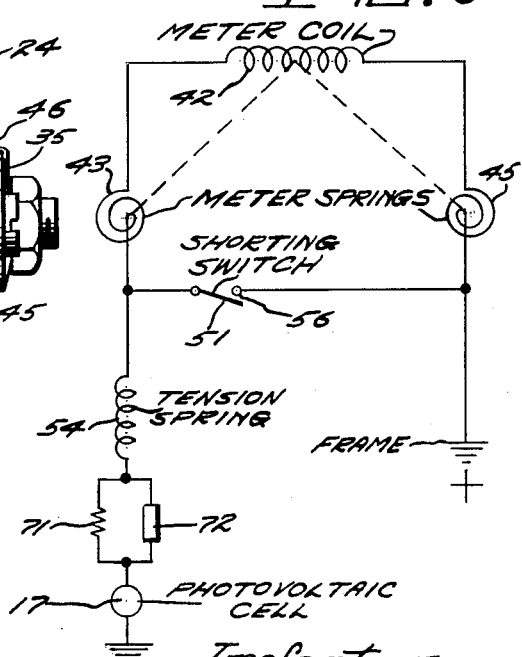
Inventor
Henry J. Koeber
By Robert F. Miehle
Atty.

July 17, 1962 H. J. KOEBER 3,044,385
CAMERA
Filed Oct. 5, 1959 3 Sheets-Sheet 3
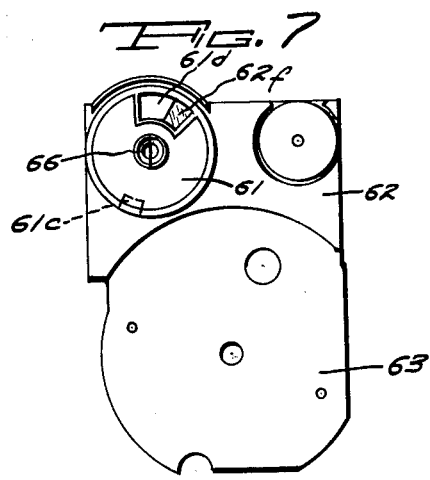
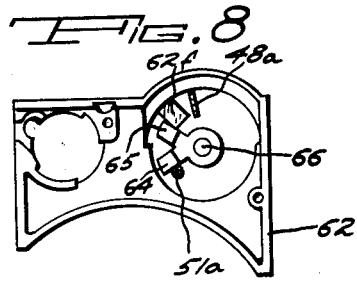
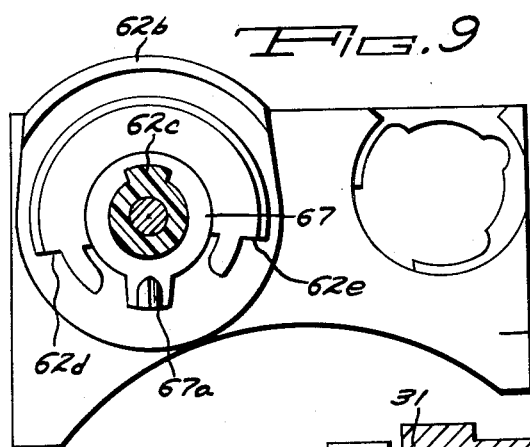
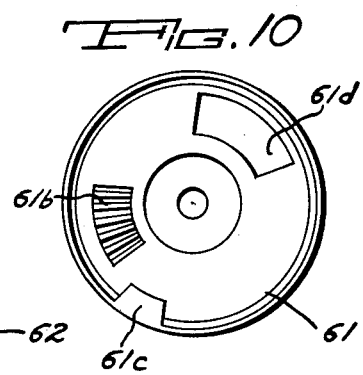
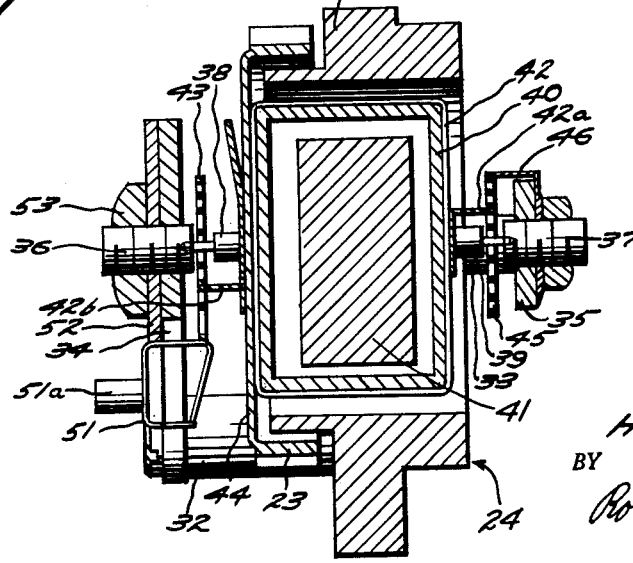
INVENTOR.
Henry J. Koeber
BY
Robert F. Miehle
Atty.

United States Patent Office 3,044,385
Patented July 17, 1962

3,044,385
CAMERA
Henry J. Koeber, Deerfield, Ill., assignor to Bell & Howell Company, Chicago, Ill., a corporation of Illinois
Filed Oct. 5, 1959, Ser. No. 844,546
6 Claims. (Cl. 95—64)

This invention relates to a camera, and more particularly to an adjustable galvanometer mechanism of an automatic exposure control mechanism.

An object of the invention is to provide an automatic exposure control device adjustable for different film speeds by controlling the spring bias of the galvanometer thereof.

Another object of the invention is to provide an automatic exposure control mechanism in which manually movable means serves when moved through a portion of its allowable movement to adjust the spring bias of the control mechanism and during another portion of its movement to override the automatic drive of the mechanism.

Another object of the invention is to provide a single manual control operable both to adjust the operating range of and to manually override an automatic exposure control device.

A complete understanding of the invention may be obtained from the following detailed description of a camera forming a specific embodiment thereof, when read in conjunction with the appended drawings, in which:

FIG. 1 is a front elevation view of a camera forming one embodiment of the invention with portions thereof broken away;

FIG. 2 is a fragmentary, vertical sectional view taken along line 2—2 of FIG. 1;

FIG. 3 is a fragmentary, vertical section taken along line 3—3 of FIG. 1;

FIG. 4 is an enlarged front elevation view of a combined film speed adjustment and manual override mechanism of the camera of FIG. 1;

FIG. 5 is an enlarged side elevation view of the mechanism of FIG. 4;

FIG. 6 is a schematic view of a wiring diagram of the automatic exposure control device of the camera of FIG. 1;

FIG. 7 is a front elevation view of a portion of the film speed adjustment and manual override mechanism;

FIG. 8 is a rear elevation view of a portion of the mechanism shown in FIG. 7;

FIG. 9 is a front elevation view of the mechanism shown in FIG. 8;

FIG. 10 is a rear elevation view of a control knob of the mechanism shown in FIG. 8; and FIG. 11 is a sectional view taken along line 11—11 of FIG. 4.

The invention provides a camera having a manually movable member which, when moved along a portion of its path of movement, adjusts the operable range of an automatic exposure control device, and, when moved along another portion of its path of movement, manually sets the exposure control device. Preferably the automatic exposure control device includes a galvanometer coil biased by spring means toward a position holding a diaphragm in its fully open position and normally driven by a light-controlled source of current in a direction such as to close the diaphragm. A manually rotatable knob, when in one portion of its permitted rotation, regulates the spring tension of the spring means and, when in another portion of its permitted rotation, closes a switch to shunt power from the coil and mechanically sets the position of the coil and therefore the diaphragm.

Referring now in detail to the drawings, a motion picture camera shown in FIG. 1 includes a housing 11 and an automatic exposure control device 12, which sets diaphragm blades 13 and 14 to provide an experture 15 of a size determined by the scene lighting measured by light entering a grilled window 16 positioned in front of a photovoltaic cell 17 (FIG. 6). The window 16 is positioned just below a viewfinder 18 (FIG. 1) at the top of the camera. The device 12 is generally of the type disclosed and claimed in Bagby et al. Patents 2,841,064 and 2,858,754, and the diaphragm blades 13 and 14 are rotatable in bearings 19 and 20 mounted in plates 21 and 22 and mesh with a driving gear 23 of a galvanometer 24.

The galvanometer 24 (FIG. 2) includes a stator frame 31 fixed to the mounting plate 22 and having studs 32 and 33 supporting bearing straps 34 and 35. The straps mount bearings 36 and 37 (FIG. 11) supporting aligned shaft ends 38 and 39 joined by a coil frame 40. The stator supports a fixed magnetic core 41 around which the coil frame with an insulated coil 42 may rotate through about one third of a revolution. One end 42a is fastened at one end electrically to the shaft 39 which is grounded electrically. The other end 42b of the coil is connected electrically to the inner end of a spiral spring 43 which end is mechanically fixed to the shaft 38 and is electrically insulated from the shaft 38, the frame 40, and a frame 44 fixed to the shaft 38 and mounting the gear 23 rigidly thereon. A second spiral spring 45 is fixed at its inner end to the shaft 39 and at its outer end to a bracket 46 fixed to the strap 35. The spring 45 normally urges the rotor or coil assembly including the gear 23 in a clockwise direction, as viewed in FIG. 4, to a position in which further movement is stopped by a stop 47 fixed to the bracket 34 and lying in the path of an arm 48 fixed to the frame 44 of the rotor. In this position, the diaphragm is fully open. The spring 43 is a balancing spring and resists the action of the spring 45, the spring 43 tending to rotate the rotor oppositely to the spring 45 but with less torque than the spring 45.

The outer end of the spring 43 is connected electrically and mechanically to an electro-conductive bracket 51 fixed to a plate 52 of electrical insulation mounted rotatably on a post 53 carried by the strap 34 in alignment with the shaft 38. A coil spring 54 connected at one end mechanically to a fixed bracket 55 of electrical insulation and at the other end electrically and mechanically to the electro-conductive bracket 51 tends to hold the bracket 51 against a combined stop and electrically grounding contact shoulder 56 of the strap 34, in which position the output of the photo-electric cell 17 is grounded so that no power is supplied to the coil 42. When the plate 52 is swung clockwise, as viewed in FIG. 4, the bracket or contactor 51 moves away from the contact 56 and the cell 17 supplies the coil 42 with current to drive the coil against the spring 45 until the torques are balanced. As the plate 52 and bracket 53 are turned clockwise, the spring 43 is unwound to lessen its torque on the galvanometer rotor thereby increasing the resultant torque of the springs 43 and 45 tending to open the diaphragm. Thus, the amount of current required to close the diaphragm a given amount from its fully open position may be varied, the operating range of the automatic exposure control device being shifted.

To manually set the plate 52 in a desired position for a selected film speed, a knob 61 (FIG. 10) is turned in a front panel 62 of the camera mounted on a turret mount 63. This turns arms 64 and 65 (FIG. 8) fixed to shaft 66 keyed to the knob 61, and the arm 64 engages pin 51a of the bracket 51 and moves the plate 52 and bracket 51 until the desired torque from the springs 43 and 45 is obtained for the film speed. The knob 61 has a calibrated film speed scale 61a (FIG. 3) printed or engraved on the periphery thereof which is observed through a window 62a in an overhanging guard 62b of the panel 62. The knob is held in adjusted position by a toothed arcuate sector 61b (FIG. 10) and a spring detent 67a of a spring washer 67 (FIG. 9) positioned between the panel 62 and the knob 61 and keyed to the panel by key 62c. The knob 61 (FIG. 10) has a permitted path of travel as limited by a projection 61c and shoulders 62d and 62e (FIG. 9) of the panel. The portion of this path of travel in which the knob sets the exposure control device for different film speeds and automatic operation is that in which the projection 61c is near to the shoulder 62d and the knob has an arcuate opening 61d exposing a transparent window 62f during this portion of the path of the knob. The window 62f is aligned with one end of a light pipe 68 (FIGS. 1 and 5) the other end being visible in the viewfinder 18.

For manually overriding the automatic exposure control device 12 (FIG. 1) and manually setting the diaphragm, the knob 61 is rotated counter-clockwise, as viewed in FIG. 7, from its setting at a particular film speed, and first permits the contactor 51 to engage the contact 56 (FIG. 6) to shunt out the coil 42, meanwhile closing the window 62f (FIG. 7) so that the light to the light pipe 68 is cut off. Then, on further rotation of the knob, the arm 65 (FIG. 8) engage sa tab 48a of the needle 48 and moves the galvanometer rotor (including the gear 23) against the action of the spring 45 until the diaphragm has the desired aperture, as indicated by the position of the needle 48 visible through window 62g (FIG. 3) of panel 62 and relative to f-stop scale 62h. The friction between the knob 61 and the panel 62 is sufficient to hold the knob in its adjusted position.

The needle 48 also carries a red colored transparent flag 48b which moves over the end of the light pipe 68 when the diaphragm is fully open to provide a red signal in the viewfinder. A temperature compensating network comprising a resistor 71 and a thermistor 72 (FIG. 6) is provided in the photo-electric circuit.

While the invention is thus described, it is not wished to be limited to the precise details described, as changes may be readily made without departing from the spirit of the invention.

What is claimed is:

1. In a camera, a housing, a diaphragm, light sensitive means, a galvanometer including spiral spring means, a rotor member connected to one end of and biased by the spring means and actuated by the light sensitive means to close the diaphragm against the action of the spring means, a manual control member mounted movably on the housing, first coupling means driven by the control member and connected to the other end of the spring means and operable during a first portion of the movement of the control member to adjust the bias of the spring means to adjust the operation of the galvanometer, and second coupling means operable during a second portion of the movement of the control member to turn the rotor member against the bias of the spring.

2. In a camera, a housing, a diaphragm, light sensitive means, a galvanometer including spiral spring means, a rotor member connected to one end of and biased by the spring means and actuated by the light sensitive means to close the diaphragm against the action of the spring means, a manual control member mounted movably on the housing, first coupling means driven by the control member and connected to the other end of the spring means and operable during a first portion of the movement of the control member to adjust the bias of the spring means to adjust the operation of the galvanometer, second coupling means operable during a second portion of the movement of the control member to turn the rotor member against the bias of the spring, and switch means operable by the control member during the second portion of the movement of the control member to render the drive of the galvanometer inoperative.

3. In a camera, a housing, a diaphragm, light sensitive means, a galvanometer including spiral spring means, a rotor member biased by the spring means and actuated by the light sensitive means to close the diaphragm against the action of the spring means, a manual control member mounted movably on the housing, and coupling means operable by the control member in one position thereof to provide a predetermined bias of the spring means and operable in a second position thereof to hold the rotor member against the bias of the spring in a position holding the diaphragm in a predetermined position.

4. In a camera, galvanometer stator means, galvanometer coil means rotatable in the stator, light controlled power supply means, a diaphragm drivingly connected to the coil means and movable between an open position and a stopped down position, spring means serving to urge the coil means to a position in which the diaphragm is open, an arm mounted pivotally on an axis coaxial with the coil means, a spring fixed relative to the stator means at one end and at the other end to the arm, the spring serving to urge the arm in a direction lessening the tension of the spring means, a manual control knob rotatable coaxially relative to the arm, means on the knob serving to engage the arm and pivot it against the action of the spring when the knob is rotated in one direction to adjust the tension of the spring means, and means carried by the knob for engaging and turning the coil means against the action of the spring means when the knob is rotated in the other direction.

5. In a camera, galvanometer stator means, galvanometer coil means rotatable in the stator, light controlled power supply means, a diaphragm drivingly connected to the coil means and movable between an open position and a stopped down position, a first spiral spring connected at one end to one end of the coil means and at the other end to the stator means and serving to urge the coil means to a position in which the diaphragm is open, a second spiral spring connected at one end to the other end of the coil means and acting on the coil means in opposition to and being weaker than the first spiral spring, an arm mounted pivotally on an axis coaxial with the coil means, a third spring serving to urge the arm in a direction lessening the tension of the second spiral spring, a manual control knob rotatable coaxially relative to the arm, means on the knob serving to engage the arm and pivot it against the action of the third spring when the knob is rotated in one direction to adjust the tension of the second spiral spring, and means carried by the knob for engaging and turning the coil means against the action of the first spiral spring when the knob is rotated in the other direction.

6. In a camera, galvanometer stator means, galvanometer coil means rotatable in the stator, light controlled power supply means, a diaphragm drivingly connected to the coil means and movable between an open position and a stopped down position, a first spiral spring connected at one end to one end of the coil means and at the other end of the stator means, the spring being electro-conductive to serve as one lead to the coil means and also serving to urge the coil means to a position in which the diaphragm is open, a second spiral spring connected at one end to the other end of the coil means, the second spiral spring being electro-conductive and acting on the coil means in opposition to and being weaker than the first spiral spring, an arm of electrical insulating material mounted pivotally on an axis coaxial with the coil means, a contact member carried by the arm and connected to the other end of the second spiral spring, a fixed contact connected electrically to the first spiral spring and lying in the path of the contact member, a third spring connected to the power supply means and fixed relative to the stator means at one end and at the other end to the arm and contact member, the third spring serving to supply power to the coil means and to urge the arm in a direction lessening the tension of the second spiral spring and the contact member into engagement with the fixed contact, a manual control knob rotatable coaxially relative to the arm, means on the knob serving to engage the arm and pivot it against the action of the third spring when the knob is rotated in one direction to adjust the tension of the second spiral spring and move the contact member out of engagement with the fixed contact, and means carried by the knob for engaging and turning the coil means against the action of the first spiral spring when rotated in the other direction and after the contact member has engaged the fixed contact.

References Cited in the file of this patent

UNITED STATES PATENTS 2,841,064    Bagby et al. _____ July 1, 1958

FOREIGN PATENTS 827,027    France _____ Jan. 18, 1938